Patented Mar. 5, 1929.

1,703,920

UNITED STATES PATENT OFFICE.

CHARLES E. BRADLEY, OF MONTCLAIR, NEW JERSEY, AND WILLIS A. GIBBONS, OF NEW YORK, N. Y., ASSIGNORS TO THE NAUGATUCK CHEMICAL COMPANY, A CORPORATION OF CONNECTICUT.

COATING COMPOSITION.

No Drawing. Application filed July 2, 1921. Serial No. 482,175.

This invention relates to coating compositions and is more particularly directed to varnishes, lacquers, and the like comprising derivatives of rubber.

A chloride of crude rubber known as heptachlorcaoutchouc has been described as a suitable material for varnish gum. When compared with an ordinary varnish gum, however, using solutions of equal concentration of the two materials, the solutions of the caoutchouc have been found to be more viscous than those of varnish and to flow less readily when applied. The film of the crude rubber derivative is also cohesive and ordinarily not particularly adherent to the surface to which applied. For example, a solution of rubbed chloride, when poured on glass or similar smooth surface, upon drying may be stripped off as a thin continuous film. The film is fairly flexible. At least it is not to be regarded as brittle in the ordinary sense of the term. It further has only a low lustre or gloss. These properties do not recommend a material for use as a varnish gum, since the latter ordinarily provides solutions of low viscosity which spread well, which adhere to the surface to which applied, and which have a brittleness similar, for example, to shellac as well as a good lustre or gloss.

An object of the present invention accordingly is to provide compositions of rubber derivatives and similar materials which shall provide coatings like those furnished by the better varnish gums. Another object of the invention is to provide a lacquer having in general the desirable properties of lacquers made from nitro-cellulose and similar solutions.

The invention accordingly broadly consists of a coating composition comprising a solution of a halogenated combined rubber in a volatile solvent having a viscosity sufficiently low to permit spreading and providing a relatively brittle coating having a good lustre or gloss.

The expression "combined rubber" herein used is intended to include rubber or similar material vulcanized with sulphur, nitro-compounds or other vulcanizing agents, and rubber resulting from other chemical treatment such as halogenation etc.

It will be understood that by halogenation, it is intended to include other compounds of the halogens having a similar action such as the halogen acids as set forth in our copending application Serial No. 479,100, filed June 20, 1921.

It will also be understood that where the "combined" rubber employed in the process is halogenated rubber, the halogenation of such combined rubber is accomplished by a halogen or halogen acid which differs from that present in the combined rubber.

The preferred coating composition is either a spirit or oil varnish comprising rubber vulcanized with sulphur and chlorinated, for example chlorinated inner tubes. Chlorination is preferably carried out according to the procedure in our co-pending application Serial No. 479,100, filed June 20, 1921, now Patent No. 1,627,725, issued May 10, 1927, and the product is one of those therein set forth.

If a spirit varnish is desired 34 lbs. of chlorinated sulphur-vulcanized rubber, 66 lbs. of benzol and 25 lbs. of solvent naphtha are mixed. Solution takes place almost immediately at ordinary room termperature providing a liquid which flows substantially as freely from the brush as an equivalent solution of shellac. The viscosity is about half that of a corresponding solution of rubber chloride. The film formed from this varnish upon drying is somewhat more resistant to the action of hot water than shellac. It apparently is much less affected by cold water than this material. It resists abrasion better and withstands blows about as well as shellac. It may be dissolved much more readily than shellac. In general it is highly resistant to the action of aqueous chemicals. If the solution mentioned be poured upon a smooth surface such as glass and allowed to dry the film thus formed can ordinarily not be stripped continuously unless it is quite thick and unless the stripping takes place when a small quantity of the solvent is present. The film is in other words more brittle than that of rubber chloride and posseses better adhesion to the glass. By reason of its lower viscosity and greater adhesion it it therefore better adapted as a coating material for wood, metal, and other substances. It will be understood that solvent naphtha or similar material may be omitted from the above formula and that other solvents than benzol may be employed. It will be observed, however, that a high boiling solvent such as naphtha is preferably employed. Such solvent upon drying of the varnish solutions remains until the end of the drying and insures an even lustrous coat.

If an oil varnish is desired, chlorinated vulcanized rubber, boiled linseed oil and solvent naphtha are combined. Dried chlorinated vulcanized rubber is dissolved in solvent naphtha in proportions of 100 grams of the chlorinated product to 140 cc. of solvent naphtha. When solution is complete it is added slowly with constant stirring to 100 cc. of boiled linseed oil. If desired raw linseed oil may be used but in this event approximately 0.5% of drier should be employed to secure a varnish adapted to dry in twenty-four hours. With boiled linseed oil such drying may be accomplished without the use of driers. The oil varnish has a similar desirable low viscosity, is highly resistant to the action of various chemicals, has high resistance to abrasion, and resists cracking under blows of sharp objects. In other respects it generally resembles the film of the spirit varnish.

It will also be understood that the various other combined rubbers set forth in our copending application mentioned may also be employed. For example a light-colored lustrous spirit or oil varnish may also be obtained by substituting for chlorinated sulphur-vulcanized rubber, in the above formulas, the sulphur chloride treated crude and combined rubber set forth in the application mentioned.

Dip lacquers may be made by adding to the spirit varnishes various pigments. The following is an example of a white dip lacquer:

|  | Parts by weight. |
|---|---|
| Chlorinated vulcanized rubber | 100 |
| Sublimed white lead 40% | } 25- 250 |
| Titanium oxide 60% | |
| Benzol | 375-1750 |

In general the quantity of benzol employed should be approximately three to five times by weight of the solids employed depending on the contour of the articles dipped. For articles having other than a smooth contour a dilute solution should be employed. For articles having a smooth contour a more concentrated one may be used.

Red and blue dip lacquers may be prepared by substituting for the white pigment mentioned in the above formula 5–50% respectively of toluidine toner or ultramarine based on the weight of the chlorinated rubber employed.

A brush lacquer may be made in accordance with the following formula:

| Dried chlorinated vulcanized rubber | 100 kg. |
|---|---|
| Sublimed lead and titanium oxide | 100 kg. |
| Solvent naphtha | 200 litres. |

Similar additions of pigments to the oil varnishes will produce white and other colored enamels.

As many apparently widely different embodiments of this invention may be made without departing from the spirit thereof, it will be understood that we do not intend to limit ourselves to the specific embodiments herein set forth except as indicated in the appended claims.

Having thus described our invention, what we claim and desire to protect by Letters Patent is:

1. A coating composition comprising a solution of a halogenated combined rubber in two solvents, one of which has a relatively high boiling point.

2. A coating composition comprising a solution of halogenated vulcanized rubber in benzol and solvent naphtha.

3. A coating composition comprising a solution of a chlorinated vulcanized rubber comprising chlorinated vulcanized rubber 27%, benzol 53%, solvent naphtha 20%.

4. A coating composition comprising a chlorinated vulcanized rubber, a pigment, and a solvent.

5. A coating composition comprising chlorinated vulcanized rubber 100 parts, a pigment in the proportion of 5–250 parts and benzol in the proportion of 3 to 5 times the weight of the solids.

6. A coating composition comprising a solution of a sulphur chloride-treated combined rubber in two solvents, one of which has a relatively high boiling point.

7. A coating composition comprising a solution of a halogenated sulphur chloride-treated combined rubber in a volatile solvent comprising solvent naphtha.

8. A varnish comprising a solution of a chlorinated, sulphur-vulcanized rubber in two volatile solvents, one of which has a relatively low boiling point and the other a relatively high boiling point.

9. A varnish comprising chlorinated vulcanized rubber, a drying oil, and a volatile solvent.

10. A varnish comprising chlorinated vulcanized rubber, boiled linseed oil and solvent naphtha.

11. A chlorinated rubber solution containing at least 25% of chlorinated rubber and an unsaturated glyceride.

12. A coating composition comprising a solution of chlorinated rubber in a volatile solvent, and boiled linseed oil.

Signed at New York, New York, this 20th day of June, 1921.

CHARLES E. BRADLEY.

Signed at New York, New York, this 20th day of June, 1921.

WILLIS A. GIBBONS.